A. A. JOHNSON.
FEED MECHANISM FOR WOODWORKING MACHINES.
APPLICATION FILED MAY 23, 1921.

1,428,036.

Patented Sept. 5, 1922.

WITNESS:
Robt. R. Kitchel.

INVENTOR
Albert A. Johnson
BY
Frank L. Busser
ATTORNEY.

Patented Sept. 5, 1922.

1,428,036

UNITED STATES PATENT OFFICE.

ALBERT A. JOHNSON, OF MOUNT HOLLY, NEW JERSEY.

FEED MECHANISM FOR WOODWORKING MACHINES.

Application filed May 23, 1921. Serial No. 471,881.

*To all whom it may concern:*

Be it known that I, ALBERT A. JOHNSON, a citizen of the United States, residing at Mount Holly, county of Burlington, and State of New Jersey, have invented a new and useful Improvement in Feed Mechanism for Woodworking Machines, of which the following is a full, clear, and exact description, reference being had to the accompanying drawings, which form a part of this specification.

This invention relates to an improvement in feed mechanism for feeding pieces of lumber through a machine in which the pieces are operated on at different stations by different cutters, etc.

The precise nature of my invention will be best understood by reference to the accompanying drawings which will now be described, it being premised, however, that various changes may be made in the details of construction without departing from the spirit and scope of my invention as defined in the appended claims.

Fig. 1 of the drawings is a longitudinal section through one form of my improved feeding mechanism which is shown somewhat diagrammatically for clearness.

Fig. 5 is a fragmentary view showing a modification.

Figure 1:
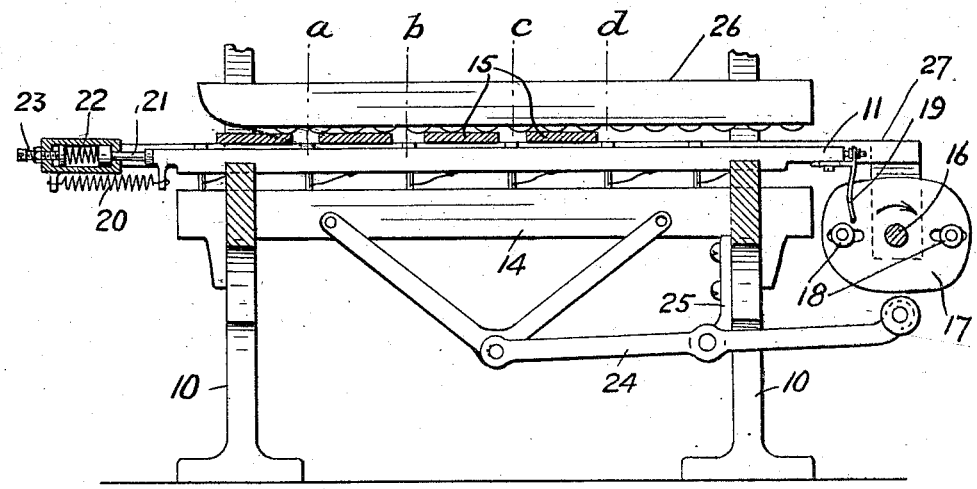
Figure 2:
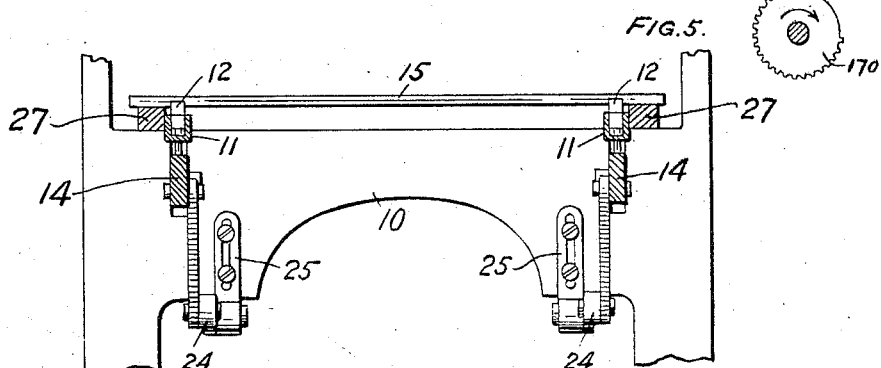
Fig. 2 is a transverse sectional view of a portion of the device shown in Fig. 1.
Figure 3:
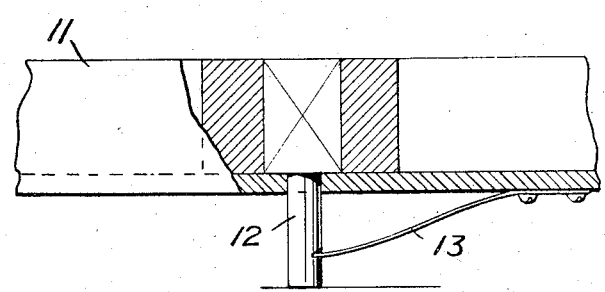
Figs. 3 and 4 are detail sectional views of the feed pins.
Figure 4:
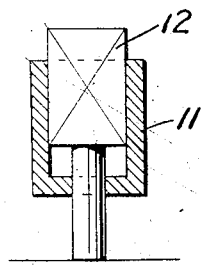

In these drawings, the reference character 10 designates the frame of a wood-working machine. Wood-working tools or cutters may be mounted on the frame at all or any of the stations $a$, $b$, $c$ and $d$, which tools may be power driven in any desired manner, and from any desired source.

Mounted for reciprocation in suitable guides in the frame 10 of the machine are feed bars 11, there being one on each side of the machine. 12 are spaced feed pins slidably mounted in the feed bars 11, and 13 are leaf springs connected to the bars 11, the free ends thereof engaging the pins for positively moving the pins downwardly as hereinafter described.

These pins are provided with rectangular body portions for presenting broad surfaces to the lumber to be fed thereby as well as to provide means for preventing the pins from rotating, and are also provided with projecting circular stems which extend through circular openings in the bars 11.

14 are feed pin elevating members, there being one on each side of the machine, and are arranged to be moved vertically in suitable guides on the frame 10 for raising the feed pins 12 for advancing the pieces of lumber, such as 15, from station to station, and to permit said pins to drop below said pieces of lumber when the feed bars 11 are returned as hereinafter set forth.

16 is a shaft journaled in bearings on the frame 10, and 17 are cams secured thereto, there being one on each side of the machine. The shaft 16 may be driven in any desired manner to rotate the cams 17 in the direction indicated by the arrow shown in Fig. 1. Connected to each cam 17 are rollers 18 on screw pins adjustably mounted in radial slots therein, and which are arranged to engage projections 19 on the feed bars 11 to shift said bars to feed the strips of lumber from one position to the next past the different stations. Each feed bar is provided with a return spring 20, and a spring-pressed stop 21 for limiting the return movement of the feed bar. The stop is normally held in its extended position by a spring 22 which is stronger than spring 20, while the tension of the spring 22 is arranged to be adjusted by a screw 23.

24 are levers pivotally connected to brackets 25 adjustably mounted on the frame 10. Each lever 24 is provided with a roller at one end for engagement with its cam 17 for rocking the lever to raise its member 14 through its connection therewith to raise the pins 12 to advance the strips of lumber one step. 26 is a hold-down device for the strips 15 which may be yieldingly held in any desired manner to hold the strips in contact with the rails or bed 27 of the machine.

In the operation of the device, the strips to be fed through the machine are fed to the bed between the first two pins 12 at the left hand end of the machine, and as the cams 17 are double cams each strip will be fed two steps for each revolution of the shaft 16. As the cams 17 are rotated clockwise from the position shown, the peripheries of the cams will engage the rollers on the ends of the levers 24, depress said ends of the levers, and elevate the bars 14 and raise the pins 12 into the plane of the strips 15. One set of rollers 18 will then engage the projections 19 and advance the strips one step, or from one station to the next. The projections 19 should be so shaped as to cause the feed bars or lumber carriers to move with a uniform speed throughout their travel.

The shape of the cams is such that the members 14 will again be in their lowered positions before the feed bars 11 have been shifted to their extreme positions by the rollers 18, but as the friction between the pins 12 and the strips 15 caused by the work required to shift the strips between the hold-down 26 and the bed is greater than the pressure of the springs 13 the pins 12 will not be lowered until the feed movement of the bars 11 is completed. Immediately after the feed movement of the bars 11 has been completed and the frictional resistance to the downward movement of the pins has been removed, the springs 13 will act to draw the pins 12 to their lowered positions before the springs 20 act to return the feed bars to the position shown.

It is important that the two feed bars 11 should be operated at the same time by rollers 18. Projections 19 are therefore adjustably mounted on the bars as shown in Figure 1.

In Fig. 5 is shown a modified form of mechanism for operating the feed bars. In place of cams 17, gears 170 are fixed to the driving shaft, one beneath each of the feed bars. These gears are provided with teeth for a portion of their circumference only, which mesh with teeth on feed bars 111. As the driving shaft is continuously driven, starting from the position shown in Fig. 5, gears 170, only one of which is shown, will draw the feed bars to the right as long as the teeth mesh. When they come to the plane portions of their circumference, the feed bars will be freed and will be at once retracted by their springs 20. In this way an intermittent motion is given which feeds the bars forward at a constant speed. This method gives one reciprocation for each revolution of the driving shaft, the length of motion being fixed by the length of the tooth portions of the gears.

Having now fully described my invention, what I claim and desire to protect by Letters Patent is:

1. A feed mechanism for a work piece of the type described comprising a feed bar, means for reciprocating said bar, a pin in said bar, and means for reciprocating said pin in timed relation to the movement of the feed bar to shift the pin into feeding position with relation to the work piece on the forward movement of the bar and to retract the pin out of the line of movement of the work piece on the return movement of the bar.

2. A step by step feed mechanism for feeding strips from station to station of a wood-working machine, having a feed bar on each side of the machine, cam means for reciprocating said bars, feed pins in each bar, cam means for raising said pins into the path of the strips to move the strips forward, and spring means for retracting the pins out of the path of the strips after the strips have been shifted.

3. A step by step feed mechanism for feeding strips from station to station of a wood-working machine, having a feed bar on each side of the machine, cam means for moving said bars, feed pins in each bar, cam means for raising said pins, and springs for lowering said pins.

4. A step by step feed mechanism for feeding strips from station to station of a wood-working machine, having a feed bar on each side of the machine, adjustable cam means for moving said bars, feed pins in each bar, cam means for raising said pins, and springs for lowering said pins.

In testimony of which invention, I have hereunto set my hand, at Phila., Penna., on this 20th day of May, 1921.

ALBERT A. JOHNSON.